US012159570B2

(12) United States Patent
Sung et al.

(10) Patent No.: US 12,159,570 B2
(45) Date of Patent: Dec. 3, 2024

(54) LIGHT-EMITTING DEVICE

(71) Applicant: Innolux Corporation, Miaoli County (TW)

(72) Inventors: Li-Wei Sung, Miaoli County (TW); Chung-Le Chen, Miaoli County (TW); Shuo-Ting Hong, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/331,192

(22) Filed: Jun. 8, 2023

(65) Prior Publication Data

US 2024/0029638 A1 Jan. 25, 2024

(30) Foreign Application Priority Data

Jul. 19, 2022 (CN) ......................... 202210847449.6

(51) Int. Cl.
*G09G 3/32* (2016.01)

(52) U.S. Cl.
CPC ....... *G09G 3/32* (2013.01); *G09G 2310/0275* (2013.01); *G09G 2320/0673* (2013.01)

(58) Field of Classification Search
CPC ...... G09G 3/3233; G09G 3/3291; G09G 3/32; G09G 3/3275; G09G 3/3208; G09G 3/322; G09G 2320/0233; G09G 2320/0295; G09G 2320/043; G09G 2320/045; G09G 2300/0819; G09G 3/3225; G09G 2320/0673; G09G 2310/0275
See application file for complete search history.

(56) References Cited

U.S. PATENT DOCUMENTS 9,280,932 B2 * 3/2016 Kim ..................... G09G 3/3233
2013/0257845 A1 10/2013 Chaji et al.
2013/0313985 A1 * 11/2013 Choi .................. H05B 45/3725 315/192
2015/0348463 A1 * 12/2015 Lee ...................... G09G 3/3233 345/212

* cited by examiner

*Primary Examiner* — Xuemei Zheng
(74) *Attorney, Agent, or Firm* — JCIPRNET

(57) ABSTRACT

A light-emitting device is disclosed. The light-emitting device includes a light-emitting element, a driving circuit, and a compensation unit. The driving circuit is coupled to the light-emitting element, and is configured to receive a first data signal, drive the light-emitting element, and output a sensing signal. The compensation unit is coupled to the driving circuit, and is configured to receive the sensing signal and compensate the first data signal. The compensation unit includes a first comparator circuit and a second comparator circuit. The first comparator circuit includes a first addition terminal, a first subtraction terminal, and a first output terminal. The second comparator circuit includes a second addition terminal and a second subtraction terminal. The first subtraction terminal receives the sensing signal. The first output terminal is coupled to the second addition terminal.

17 Claims, 5 Drawing Sheets

130_1

LIGHT-EMITTING DEVICE

CROSS-REFERENCE TO RELATED APPLICATION

This application claims the priority benefit of Chinese application no. 202210847449.6, filed on Jul. 19, 2022. The entirety of the above-mentioned patent application is hereby incorporated by reference herein and made a part of this specification.

BACKGROUND

Technical Field

The disclosure relates to an electronic device, and in particular to a light-emitting device.

Description of Related Art

Generally speaking, a light-emitting device may utilize a driving circuit to drive a light-emitting element to provide an output light. For example, the driving circuit may provide a driving electrical energy (e.g., a driving current or a driving voltage) to drive the light-emitting element. However, a threshold voltage of transistors in the driving circuit changes in different circumstances. The change in the threshold voltage may change the driving electrical energy provided by the driving circuit, and then changes brightness of the output light provided by the light-emitting element in different circumstances.

Furthermore, if the light-emitting device utilizes a plurality of driving circuits to drive a plurality of light-emitting elements, circuit impedances in the driving circuits may also be different based on different layout positions of the driving circuits, causing uneven brightness between the light-emitting elements.

SUMMARY

The disclosure provides a light-emitting device, in a driving circuit provides a stable driving electrical energy to a corresponding light-emitting element in different circumstances and at different layout positions.

According to an embodiment of the disclosure, a light-emitting device includes a light-emitting element, a driving circuit, and a compensation unit. The driving circuit is coupled to the light-emitting element, and is configured to receive a first data signal, drive the light-emitting element, and output a sensing signal. The compensation unit is coupled to the driving circuit, and is configured to receive the sensing signal and compensate the first data signal. The compensation unit includes a first comparator circuit and a second comparator circuit. The first comparator circuit includes a first addition terminal, a first subtraction terminal, and a first output terminal. The second comparator circuit includes a second addition terminal and a second subtraction terminal. The first subtraction terminal receives the sensing signal. The first output terminal is coupled to the second addition terminal.

Based on the foregoing, the light-emitting device utilizes the compensation unit to receive the sensing signal output by the driving circuit and compensate the first data signal. Accordingly, the driving circuit provides a stable driving electrical energy to the light-emitting element in different circumstances and at different layout positions.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
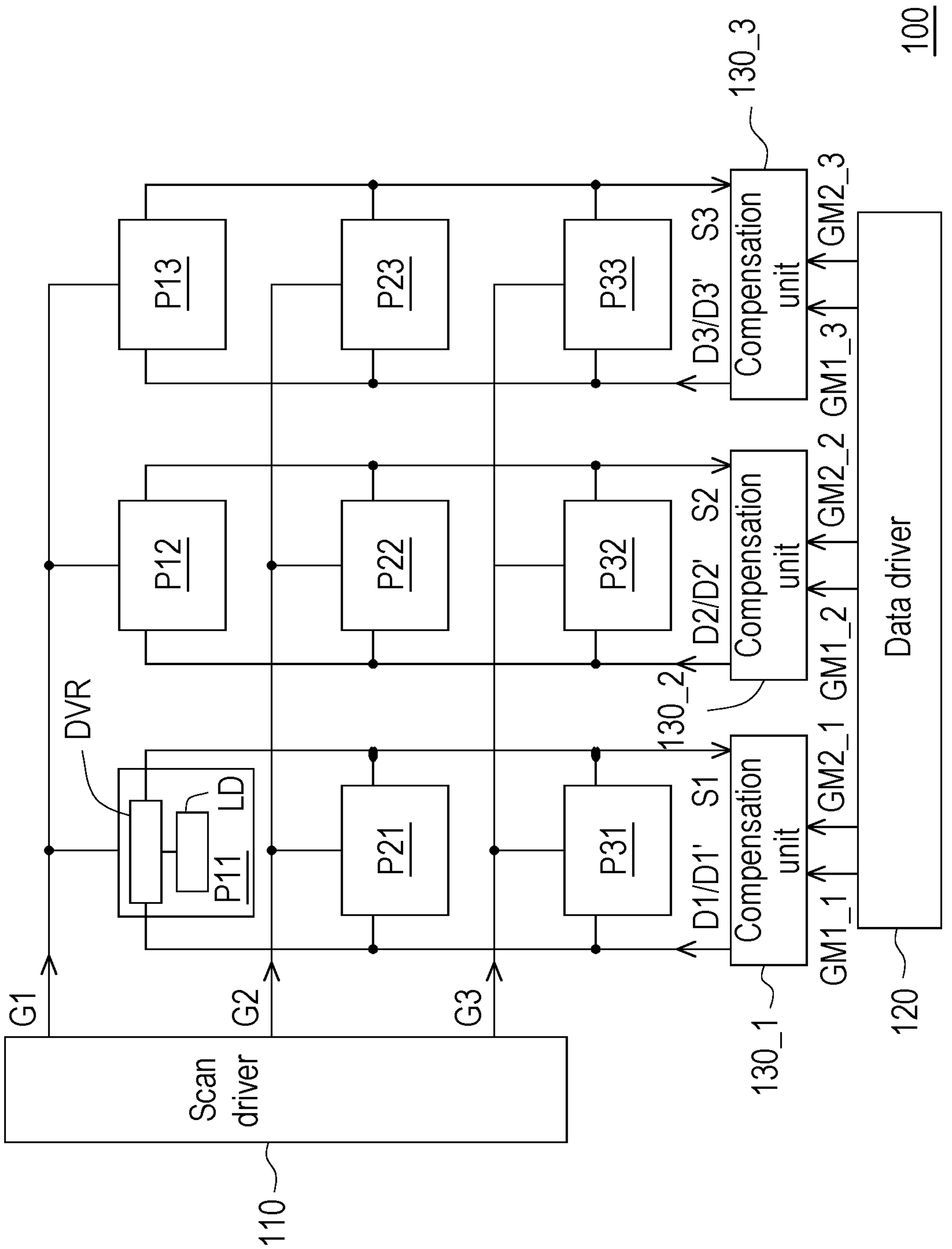
FIG. 1 is a schematic diagram of a light-emitting device according to an embodiment of the disclosure.

The disclosure may be understood with reference to the following detailed description with the drawings. Note that for clarity of description and ease of understanding, the drawings of the disclosure show a part of an electronic device, and certain elements in the drawings may not be drawn to scale. In addition, the number and size of each device shown in the drawings only serve for exemplifying instead of limiting the scope of the disclosure.

Certain terms are used throughout the description and the appended claims to refer to specific elements. As to be understood by those skilled in the art, electronic device manufacturers may refer to an element by different names. Herein, it is not intended to distinguish between elements that have different names instead of different functions. In the following description and claims, terms such as "include", "comprise", and "have" are used in an open-ended manner, and thus should be interpreted as "including, but not limited to". Therefore, the terms "include", "comprise", and/or "have" used in the description of the disclosure denote the presence of corresponding features, regions, steps, operations, and/or elements but are not limited to the presence of one or more corresponding features, regions, steps, operations, and/or elements.

It should be understood that when one element is referred to as being "coupled to", "connected to", or "conducted to" another element, the one element may be directly connected to the another element with electrical connection established, or intervening elements may also be present in between these elements for electrical interconnection (indirect electrical connection). Comparatively, when one element is referred to as being "directly coupled to", "directly conducted to", or "directly connected to" another element, no intervening elements are present in between.

Although terms such as first, second, and third may be used to describe different diverse constituent elements, such constituent elements are not limited by the terms. The terms are used only to discriminate one constituent element from other constituent elements in the description. In the claims, the terms first, second, third, and so on may be used in accordance with the order of claiming elements instead of using the same terms. Accordingly, a first constituent element in the following description may be a second constituent element in the claims.

The electronic device of the disclosure may include, but is not limited to, a display device, an antenna device, a sensing device, a light-emitting device, a touch display, a curved display, or a free-shape display. The electronic device may include a bendable or flexible electronic device. The electronic device may include, for example but not limited to, a liquid crystal, a light-emitting diode (LED), a quantum dot (QD), fluorescence, phosphor, other suitable display media, or a combination thereof. The LED may include, for example but not limited to, an organic light-emitting diode (OLED), a mini LED, a micro LED, or a quantum dot LED (including QLED and QDLED), other suitable materials, or a combination thereof. The display device may include a tiled display device, for example but not limited thereto. The antenna device may be a liquid crystal antenna, for example but not limited thereto. The antenna device may include a tiled antenna device, for example but not limited thereto. Note that the electronic device may be any arrangement or combination of the above, but not limited thereto. In addition, the shape of the electronic device may be a rectangle, a circle, a polygon, a shape with a curved edge, or other suitable shapes. The electronic device may have a peripheral system, for example, a driving system, a control system, or a light source system, to support the display device, the antenna device, or the tiled device, but the disclosure is not limited thereto. The sensing device may include a camera, an infrared sensor, or a fingerprint sensor, and the disclosure is not limited thereto. In some embodiments, the sensing device may also include a flash, an infrared (IF) light source, other sensors, electronic components, or a combination thereof, but not limited thereto.

In the embodiments of the disclosure, terms such as “pixel”, “pixel unit”, or “pixel circuit” are used as a unit for describing a specific region including at least one functional circuit for at least one specific function. The region of a “pixel” depends on the unit for providing a specific function. Adjacent pixels may share the same parts or wires, but may also include their own specific parts therein. For example, adjacent pixels may share the same scan line or the same data line, but the pixels may also have their own transistors or capacitors.

Note that technical features in different embodiments described below may be replaced, recombined, or mixed with each other to form another embodiment without departing from the spirit of the disclosure.

With reference to FIG. 1, FIG. 1 is a schematic diagram of a light-emitting device according to an embodiment of the disclosure. In this embodiment, a light-emitting device 100 includes pixel circuits P11 to P33, a scan driver 110, a data driver 120, and compensation units 130_1 to 130_3. The pixel circuits P11 to P33 are a group of pixels arranged into multiple rows and multiple columns, for example. For example, the pixel circuits P11, P12, and P13 are arranged into a first pixel row. The pixel circuits P21, P22, and P23 are arranged into a second pixel row. The pixel circuits P31, P32, and P33 are arranged into a third pixel row. The pixel circuits P11, P21, and P31 are arranged into a first pixel column. The pixel circuits P12, P22, and P32 are arranged into a second pixel column. The pixel circuit P13, P23, and P33 are arranged into a third pixel column. The scan driver 110 generates scan signals G1, G2, and G3 having different timings. The scan driver 110 provides the scan signal G1 to the first pixel row. The scan driver 110 provides the scan signal G2 to the second pixel row. The scan driver 110 provides the scan signal G3 to the third pixel row.

In this embodiment, the data driver 120 provides a first gamma signal GM1_1 and a second gamma signal GM2_1 to the compensation unit 130_1, provides a first gamma signal GM1_2 and a second gamma signal GM2_2 to the compensation unit 130_2, and provides a first gamma signal GM1_3 and a second gamma signal GM2_3 to the compensation unit 130_3.

In this embodiment, the compensation unit 130_1 is coupled to the first pixel column. First, the compensation unit 130_1 may provide a first data signal D1 according to the first gamma signal GM1_1. The first gamma signal GM1_1 is equal to the first data signal D1 (GM1_1=D1) (more specifically, a voltage of the first gamma signal GM1_1 is equal to a voltage of the first data signal D1). The compensation unit 130_2 is coupled to the second pixel column. The compensation unit 130_2 may provide a first data signal D2 according to the first gamma signal GM1_2. The first gamma signal GM1_2 is equal to the first data signal D2 (GM1_2=D2). The compensation unit 130_3 is coupled to the third pixel column. The compensation unit 130_3 may provide a first data signal D3 according to the first gamma signal GM1_3. The first gamma signal GM1_3 is equal to the first data signal D3 (GM1_3=D3). The first data signals D1 to D3 are respectively data signals first entering the pixel circuits P11 to P13.

Taking the pixel circuit P11 as an example, the pixel circuit P11 includes a light-emitting element LD and a driving circuit DVR. The driving circuit DVR is coupled to the light-emitting element LD. The driving circuit DVR receives a data signal (e.g., the first data signal D1) to drive the light-emitting element LD and output a sensing signal S1. The compensation unit 130_1 receives the sensing signal S1 output by the driving circuit DVR of the pixel circuit P11, and compensates the first data signal D1 to generate a second data signal D1'.

An example is provided here for description. The light-emitting element LD includes at least one light-emitted diode (LED) element in any form, for example (and the disclosure is not limited thereto). The driving circuit DVR receives the scan signal G1 (more specifically, a positive pulse or a negative pulse of the scan signal G1) and receives the first data signal D1 to provide a driving current (and the disclosure is not limited thereto) to drive the light-emitting element LD, and outputs the sensing signal S1. The sensing signal S1 is a signal associated with the driving current. In other words, the sensing signal S1 is a feedback signal generated by the driving circuit DVR when driving the light-emitting element LD. Therefore, the compensation unit 130_1 determines a ratio between the sensing signal S1 and the second gamma signal GM2_1. When the ratio between the sensing signal S1 and the second gamma signal GM2_1 is equal to a design value, a compensation value generated by the compensation unit 130_1 is 0. In other words, the second data signal D1' generated by the compensation unit 1301 may be equal to the first data signal D1. Comparatively, when the ratio between the sensing signal S1 and the second gamma signal GM2_1 is not equal to a design value, this indicates that the driving current is changed due to a threshold voltage of transistors in the driving circuit DVR in different circumstances, or due to the circuit impedance. Therefore, the compensation value generated by the compensation unit 130_1 is not 0, so that the compensation unit 130_1 compensates the first data signal D1 to generate the second data signal D1'. Therefore, the driving circuit DVR receives the second data signal D1' to generate a new driving current. Accordingly, the driving circuit DVR provides a stable driving electrical energy by compensating the first data signal D1 and may not be affected by different circumstances and different layout positions. In this embodiment, the compensation unit 130_2 and the compensation unit 130_3 may generate second data signals D2' and D3' similarly. Therefore, the light-emitting device 100 can improve the light emission uniformity of the pixel circuits P11 to P33 by compensating the data signals. It should be noted that, in the description above, the compensation unit 130_1 compensates the first data signal D1 once to obtain the second data signal D1' that satisfies the design requirements. Nonetheless, in some embodiments of the disclosure, the compensation unit 130_1 may compensate the first data signal D1 multiple times to obtain the second data signal D1' that satisfies the design requirements.

In this embodiment, the compensation unit 130_1 receives the first gamma signal GM1_1 and the second gamma signal GM2_1 to compensate the first data signal D1 to generate the second data signal D1'. In this embodiment, a time interval during which the second data signal D1' and the first data signal D1 are input to the driving circuit DVR is less than one frame time length. Further, the compensation unit 130_1 may first provide the first data signal D1 to the driving circuit DVR during the scanning period of the driving circuit DVR (i.e., the period during which the driving circuit DVR receives the scan signal G1). After the compensation unit 130_1 generates the second data signal D1', the compensation unit 130_1 may provide the second data signal D1' to the driving circuit DVR during the same scan period, regardless of whether the second data signal D1' and the first data signal D1 are equal or not. This action may continue until the driving circuit DVR no longer receives the scan signal G1.

In this embodiment, the second gamma signals GM2_1, GM2_2, and GM2_3 may be determined according to the light-emitting device 100 in different circumstances and/or the layout of the pixel circuits P11 to P33. The data driver 120 includes a look-up table (LUT). The look-up table records different operating conditions of the light-emitting device 100. For example, under high temperature operating condition, the look-up table may provide the second gamma signals GM2_1, GM2_2, and GM2_3 that are suitable for high temperature conditions. Under high humidity operating conditions, the look-up table may provide the second gamma signals GM2_1, GM2_2, and GM2_3 that are suitable for high humidity operations, and so on and so forth.

For ease of description in this embodiment, a plurality of pixel circuits P11 to P33 are taken as an example, but the disclosure is not limited thereto. The number of pixel circuits of the disclosure may be one or plural. The number of compensation units of the disclosure may be one or plural based on the number of pixel circuits and/or the number of pixel columns.

In this embodiment, the light-emitting device 100 may be a display, a general light source, or a back light unit (BLU) for a display. The scan driver 110 may be implemented by a shift register or a gate driving circuit, for example. In some embodiments, the compensation units 130_1 to 130_3 may be disposed inside the data driver 120, but not limited thereto.

Figure 2:
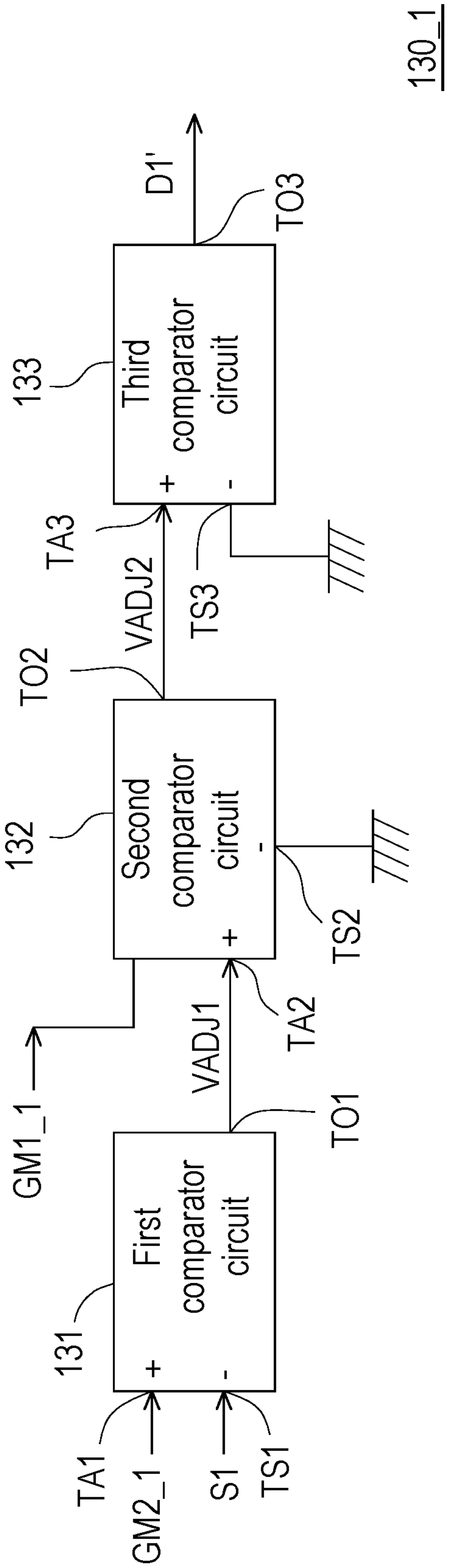
FIG. 2 is a schematic diagram of a compensation unit according to an embodiment of the disclosure.

With reference to FIG. 1 and FIG. 2 together, FIG. 2 is a schematic diagram of a compensation unit according to an embodiment of the disclosure. In this embodiment, the compensation unit 130_1 includes a first comparator circuit 131 and a second comparator circuit 132. The first comparator circuit 131 includes a first addition terminal TA1, a first subtraction terminal TS1, and a first output terminal TO1. The second comparator circuit 132 includes a second addition terminal TA2 and a second output terminal TO2. The first subtraction terminal TS1 receives the sensing signal S1. The first output terminal TO1 is coupled to the second addition terminal TA2.

In this embodiment, the first addition terminal TA1 receives the second gamma signal GM2_1. The second gamma signal GM2_1 corresponds to a target voltage signal. The sensing signal S1 is a voltage sensing signal. Therefore, the first comparator circuit 131 receives the sensing signal S1 and the second gamma signal GM2_1, and outputs a first adjustment signal VADJ1 at the first output terminal TO1. The first adjustment signal VADJ1 may be an adjustment signal generated according to a comparison result between the sensing signal S1 and the second gamma signal GM2_1. The second comparator circuit 132 receives the first adjustment signal VADJ1 through the second addition terminal TA2. In this embodiment, the second comparator circuit 132 further receives the first gamma signal GM1_1. In this embodiment, the first gamma signal GM1_1 received by the second comparator circuit 132 is equal to the first data signal D1. Therefore, after the second comparator circuit 132 receives the first adjustment signal VADJ1 and the first gamma signal GM1_1 (i.e., the first data signal D1), the second comparator circuit 132 generates a second adjustment signal VADJ2 by utilizing the first adjustment signal VADJ1 and the first gamma signal GM1_1, and accordingly outputs the second adjustment signal VADJ2 at the second output terminal TO2.

In this embodiment, the compensation unit 130_1 further includes a third comparator circuit 133. The third comparator circuit 133 includes a third addition terminal TA3 and a third output terminal TO3. After the third comparator circuit 133 receives the second adjustment comparator signal VADJ2 through the third addition terminal TA3, the third comparator circuit 133 outputs the second data signal D1' at the third output terminal TO3.

In this embodiment, the second comparator circuit 132 further includes a second subtraction terminal TS2. The third comparator circuit 133 further includes a third subtraction terminal TS3. The second subtraction terminal TS2 and the third subtraction terminal TS3 are each connected to a reference voltage (e.g., a ground).

In this embodiment, the first comparator circuit 131 may be a comparison circuit comparing the second gamma signal GM2_1 and the sensing signal S1. The second comparator circuit 132 may be an adder circuit adding the first gamma signal GM1_1 and the first adjustment signal VADJ1. The third comparator circuit 133 may be an inverting amplifier circuit amplifying the second adjustment signal VADJ2. It should be noted that the circuit diagram shown in FIG. 2 is an example, and in the disclosure, the form of the comparators and the connection between the comparators are not limited thereto.

Figure 3:
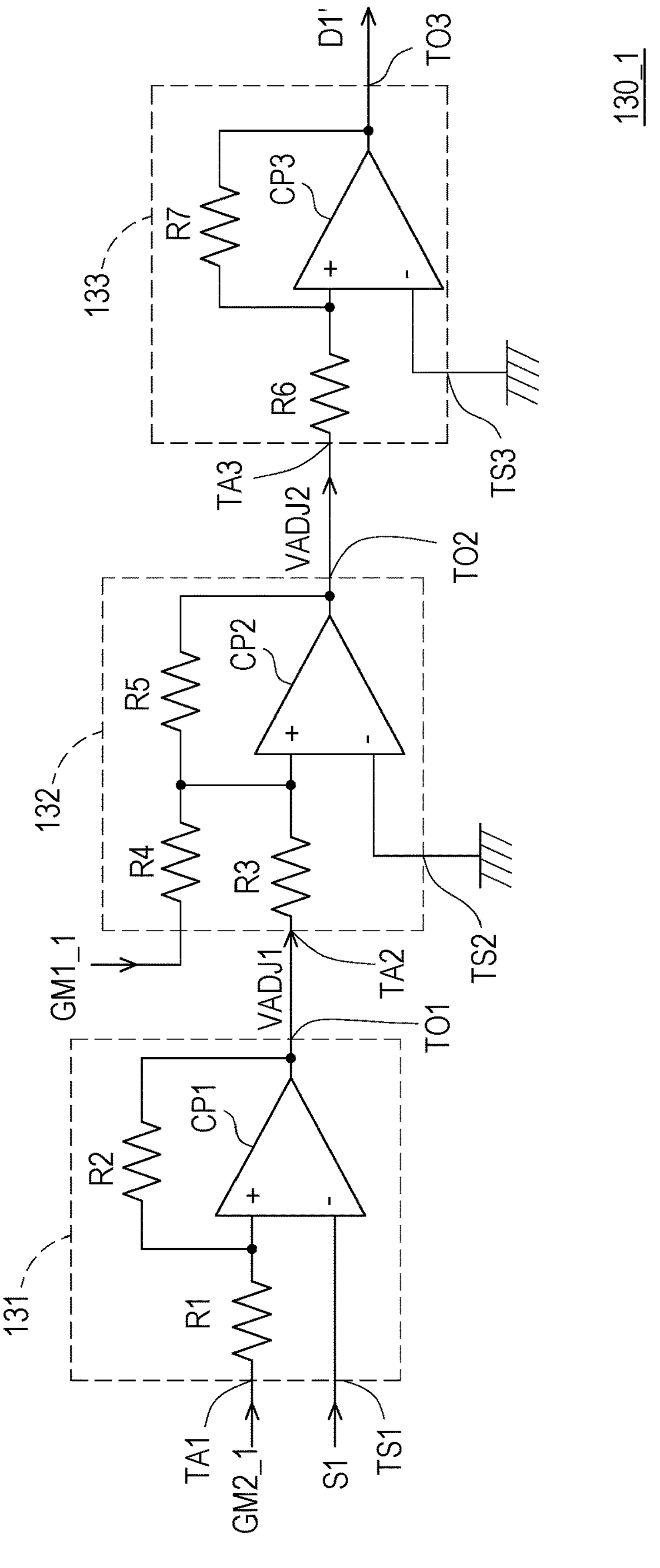
FIG. 3 is a circuit diagram of the compensation unit shown in FIG. 2.

With reference to FIG. 3, FIG. 3 is a circuit diagram of the compensation unit shown in FIG. 2. In this embodiment, the first comparator circuit 131 includes a comparator CP1 and resistors R1 and R2. The second comparator circuit 132 includes a comparator CP2 and resistors R3, R4, and R5. The third comparator circuit 133 includes a comparator CP3 and resistors R6 and R7. In this embodiment, a first terminal of the resistor R1 is taken as the first addition terminal TA1 to receive the second gamma signal GM2_1. A second terminal of the resistor R1 is connected to an addition terminal of comparator CP1. The resistor R2 is connected between the addition terminal of the comparator CP1 and an output terminal of the comparator CP1. A subtraction terminal of the comparator CP1 is taken as the first subtraction terminal TS1 and receives the sensing signal S1. The output terminal of the comparator CP1 is taken as the first output terminal TO1 to output the first adjustment signal VADJ1.

A first terminal of the resistor R3 is taken as the second addition terminal TA2 to receive the first adjustment signal VADJ1. A second terminal of the resistor R3 is connected to an addition terminal of comparator CP2. A first terminal of the resistor R4 receives the first gamma signal GM1_1. A second terminal of the resistor R4 is connected to the addition terminal of comparator CP2. The resistor R5 is connected between the addition terminal of the comparator CP2 and an output terminal of the comparator CP2. A subtraction terminal of the comparator CP2 is taken as the second subtraction terminal TS2 to be connected to a reference voltage. The output terminal of the comparator CP2 is taken as the second output terminal TO2 to output the second adjustment signal VADJ2. The second comparator circuit 132 is an inverting adder circuit, but not limited thereto.

A first terminal of the resistor R6 is taken as the third addition terminal TA3 to receive the second adjustment signal VADJ2. A second terminal of the resistor R6 is connected to an addition terminal of comparator CP3. The resistor R7 is connected between the addition terminal of the comparator CP3 and an output terminal of the comparator CP3. A subtraction terminal of the comparator CP3 is taken as the third subtraction terminal TS3 to be connected to a reference voltage. The output terminal of the comparator CP3 is taken as the third output terminal TO3 to output the second data signal D1'. The third comparator circuit 133 may be an inverting amplifier circuit, but not limited thereto.

In this embodiment, based on the circuit configuration of the compensation unit 130_1, a voltage value VD1' at the third output terminal TO3 is as presented in Formula (1).

Formula (1):

$$VD1' = \left[\left(\frac{rR1 + rR2}{rR1} \times VS1 - \frac{rR2}{rR1} \times VGM2\right) \times \left(\frac{-rR5}{rR3}\right) + \left(\frac{-rR5}{rR4}\right) \times VGM1\right] \times \left(\frac{-rR7}{rR6}\right)$$

Here, VD1' is the voltage value at the third output terminal TO3, i.e., a voltage value of the second data signal D1'. rR1 is a resistance value of the resistor R1. rR2 is a resistance value of the resistor R2. rR3 is a resistance value of the resistor R3. rR4 is a resistance value of the resistor R4. rR5 is a resistance value of the resistor R5. rR6 is a resistance value of the resistor R6. rR7 is a resistance value of the resistor R7. VS1 is a voltage value of the sensing signal S1. VGM1 is a voltage value of the first gamma signal GM1_1. VGM2 is a voltage value of the second gamma signal GM2_1.

For example, assuming that the resistance values of the resistors R1, R3, R4, R5, R6, and R7 are each designed to be 1 ohm and the resistance value of the resistor R2 is designed to be 50 ohms, then Formula (1) is simplified into Formula (2).

$$VD1' = (51 \times VS1 - 50 \times VGM2) + VGM1 \qquad \text{Formula (2)}$$

As can be seen, when a ratio between the voltage value VS1 of the sensing signal S1 and the voltage value VGM2 of the second gamma signal GM2_1 is equal to a design value, the voltage value VD1' at the third output terminal TO3 may be equal to the voltage value VGM1 of the first gamma signal GM1_1. As shown in Formula (2), when the voltage value of the sensing signal S1 is equal to (50/51) times the voltage value of the second gamma signal GM2_1 (i.e., design value=50/51), a voltage value of the first adjustment signal VADJ1 is substantially equal to 0. Therefore, the voltage value VD1' at the third output terminal TO3 may be equal to the voltage value VGM1 of the first gamma signal GM1_1. In other words, since the first gamma signal GM1_1 is equal to the first data signal D1, when the ratio between the voltage value VS1 of the sensing signal S1 and the voltage value VGM2 of the second gamma signal GM2_1 is equal to a design value, the second data signal D1' generated by the compensation unit 130_1 is equal to the first data signal D1.

Comparatively, when the ratio between the voltage value of the sensing signal S1 and the voltage value of the second gamma signal GM2_1 is not equal to the design value, the voltage value of the first adjustment signal VADJ1 is a positive voltage value or a negative voltage value. Therefore, the voltage value at the third output terminal TO3 may be changed according to the voltage value of the sensing signal S1, the voltage value of the first gamma signal GM1_1, and the voltage value of the second gamma signal GM2_1. In other words, the compensation unit 130_1 may compensate the first data signal D1 according to the voltage value of the sensing signal S1, the voltage value of the first gamma signal GM1_1, and the voltage value of the second gamma signal GM2_1 to generate the second data signal D1'.

Figure 4:
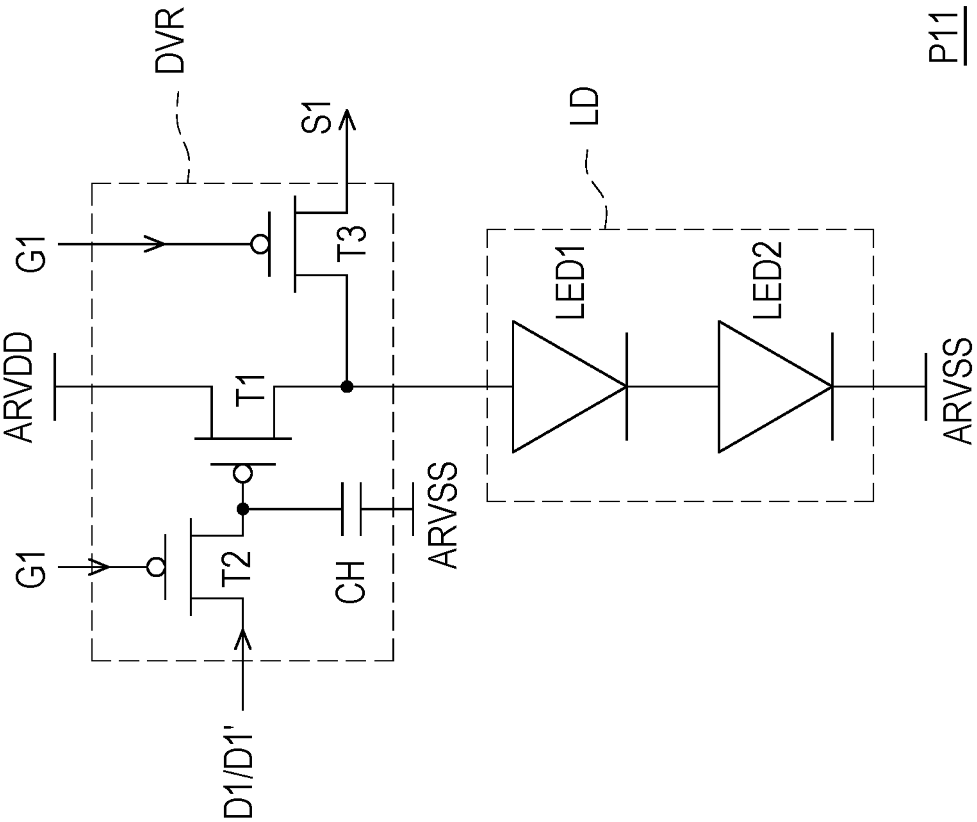
FIG. 4 is a circuit diagram of a pixel circuit according to an embodiment of the disclosure.

With reference to FIG. 1 and FIG. 4 together, FIG. 4 is a circuit diagram of a pixel circuit according to an embodiment of the disclosure. In this embodiment, the light-emitting device 100 also includes reference voltages ARVDD and ARVSS. The pixel circuit P11 includes the light-emitting element LD and the driving circuit DVR. The driving circuit DVR is coupled between the light-emitting element LD and the reference voltage ARVDD. The light-emitting element LD includes LED components LED1 and LED2 coupled in series between the driving circuit DVR and the reference voltage ARVSS. The disclosure is not limited to the number of LED components. The driving circuit DVR includes a driving transistor T1, a switch transistor T2, a sensing transistor T3, and a hold capacitor CH. A first terminal of the driving transistor T1 receives the reference voltage ARVDD. A second terminal of the driving transistor T1 is coupled to the light-emitting element LD. A first terminal of the switch transistor T2 receives one of the first data signal D1 and the second data signal D1'. A second terminal of the switch transistor T2 is coupled to a control terminal of the driving transistor T1. A control terminal of the switch transistor T2 receives the scan signal G1. A first terminal of the sensing transistor T3 is coupled to the second terminal of the driving transistor T1. A second terminal of the sensing transistor T3 outputs the sensing signal S1. A control terminal of the sensing transistor T3 receives the scan signal G1. The hold capacitor CH is coupled between the control terminal of the driving transistor T1 and the reference voltage ARVSS. The hold capacitor CH is configured to hold the voltage level at the control terminal of the driving transistor T1, but not limited thereto.

In this embodiment, each of the driving transistor T1, the switch transistor T2, and the sensing transistor T3 may each be a P-type transistor, such as a P-type thin film transistor. Therefore, the driving circuit DVR turns on the switch transistor T2 and the sensing transistor T3 based on a negative pulse of the scan signal G1. Therefore, the switch transistor T2 transmits one of the first data signal D1 and the second data signal D1' to control the control terminal of the driving transistor T1. More specifically, the driving circuit DVR receives the first data signal D1 to drive the LED components LED1 and LED2, and outputs the sensing signal S1 through the sensing transistor T3. Therefore, the sensing signal S1 is a voltage sensing signal. The voltage value of the sensing signal S1 is substantially equal to the voltage across the light-emitting element LD. In other words, the voltage value of the sensing signal S1 is substantially equal to the voltage difference between the voltage value at the second terminal of the driving transistor T1 and the voltage value of the reference voltage ARVSS.

Figure 5:
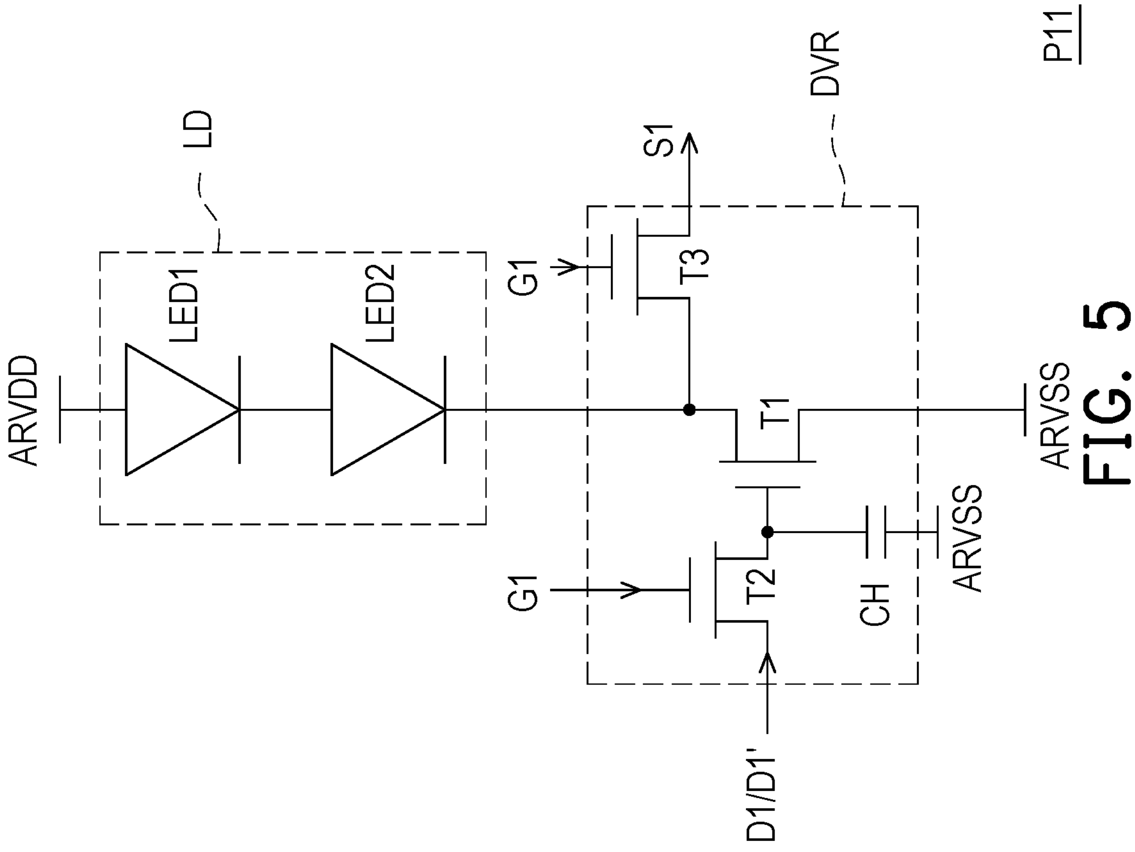
FIG. 5 is a circuit diagram of a pixel circuit according to another embodiment of the disclosure.

With reference to FIG. 5, FIG. 5 is a circuit diagram of a pixel circuit according to another embodiment of the disclosure. In this embodiment, the light-emitting device 100 further includes the reference voltages ARVDD and ARVSS. The pixel circuit P11 includes the light-emitting element LD and the driving circuit DVR. The driving circuit DVR is coupled between the light-emitting element LD and the reference voltage ARVSS. The elements in the embodiment shown in FIG. 5 is similar to those in the embodiment in FIG. 4, and are thus not repeatedly described. The main difference between this embodiment and the embodiment of FIG. 4 is that in this embodiment, the driving transistor T1, the switch transistor T2, and the sensing transistor T3 may each be an N-type transistor, such as an N-type thin film transistor. Therefore, the driving circuit DVR turns on the switch transistor T2 and the sensing transistor T3 based on a positive pulse of the scan signal G1. Therefore, the switch transistor T2 transmits one of the first data signal D1 and the second data signal D1' to control the control terminal of the driving transistor T1. Therefore, the driving circuit DVR receives the first data signal D1 to drive the LED components LED1 and LED2, and outputs the sensing signal S1 through the sensing transistor T3. The voltage value of the sensing signal S1 is substantially equal to the voltage across the light-emitting element LD. In other words, the voltage value of the sensing signal S1 is substantially equal to the voltage difference between the voltage value of the reference voltage ARVDD and the voltage value at the first terminal of the driving transistor T1.

In summary of the foregoing, the compensation unit receives the sensing signal output by the driving circuit and generates the second data signal after compensating the first data signal. Accordingly, the driving circuit provides a stable driving electrical energy to the light-emitting element in different circumstances and at different layout positions.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light-emitting device comprising:

a light-emitting element;

a driving circuit coupled to the light-emitting element, and being configured to receive a first data signal, drive the light-emitting element, and output a sensing signal; and a compensation unit coupled to the driving circuit, and being configured to receive the sensing signal and compensate the first data signal, wherein the compensation unit comprises:

a first comparator circuit comprising a first addition terminal, a first subtraction terminal, and a first output terminal; and a second comparator circuit comprising a second addition terminal and a second subtraction terminal, wherein the first subtraction terminal receives the sensing signal, and the first output terminal is coupled to the second addition terminal, wherein the first comparator circuit further receives a second gamma signal, which corresponds to a target voltage signal, through the first addition terminal, and outputs a first adjustment signal at the first output terminal, wherein the second comparator circuit receives a first gamma signal and the first adjustment signal through the second addition terminal, and the first gamma signal is equal to the first data signal.

2. The light-emitting device according to claim 1, further comprising at least two reference voltages, wherein the driving circuit is coupled between the light-emitting element and one of the at least two reference voltages.

3. The light-emitting device according to claim 1, wherein the sensing signal is a voltage sensing signal.

4. The light-emitting device according to claim 1, wherein the first comparator circuit is a comparison circuit comparing the second gamma signal with the sensing signal.

5. The light-emitting device according to claim 1, wherein the second comparator circuit further comprises a second output terminal, and the second comparator circuit outputs a second adjustment signal at the second output terminal after the second comparator circuit receives the first gamma signal and the first adjustment signal through the second addition terminal.

6. The light-emitting device according to claim 5, wherein the output terminal of the second comparator is taken as the second output terminal to output a second adjustment signal.

7. The light-emitting device according to claim 5, wherein the compensation unit further comprises a third comparator circuit, and the third comparator circuit comprises a third addition terminal and a third output terminal.

8. The light-emitting device according to claim 7, wherein the third comparator circuit is an inverting amplifier circuit amplifying the second adjustment signal.

9. The light-emitting device according to claim 7, wherein the third comparator circuit outputs a second data signal at the third output terminal after the third comparator circuit receives the second adjustment signal through the third addition terminal.

10. The light-emitting device according to claim 7, wherein the third comparator circuit comprises:

a third subtraction terminal, a third comparator, wherein a subtraction terminal of the third comparator is taken as the third subtraction terminal to be connected to a reference voltage;

a sixth resistor, wherein a first terminal of the sixth resistor is taken as the third addition terminal to receive the second adjustment signal, and a second terminal of the sixth resistor is connected to an addition terminal of the third comparator; and a seventh resistor connected between the addition terminal of the third comparator and an output terminal of the third comparator.

11. The light-emitting device according to claim 7, wherein the output terminal of the third comparator is taken as the third output terminal to output a second data signal.

12. The light-emitting device according to claim 11, wherein a time interval during which the second data signal and the first data signal are input to the driving circuit is less than one frame time length.

13. The light-emitting device according to claim 7, wherein a voltage value at the third output terminal is equal to a voltage value of the first gamma signal when a ratio between a voltage value of the sensing signal and a voltage value of the second gamma signal is equal to a design value.

14. The light-emitting device according to claim 1, wherein the first comparator circuit comprises:

a first comparator, wherein a subtraction terminal of the first comparator is taken as the first subtraction terminal and receives the sensing signal;

a first resistor, wherein a first terminal of the first resistor is taken as the first addition terminal to receive the second gamma signal, and a second terminal of the first resistor is connected to an addition terminal of the first comparator; and a second resistor connected between the addition terminal of the first comparator and an output terminal of the first comparator.

15. The light-emitting device according to claim 14, wherein the output terminal of the first comparator is taken as the first output terminal to output the first adjustment signal.

16. The light-emitting device according to claim 1, wherein the second comparator circuit is an adder circuit adding the first gamma signal and the first adjustment signal.

17. The light-emitting device according to claim 16, wherein the second comparator circuit comprises:

a second comparator, wherein a subtraction terminal of the second comparator is taken as the second subtraction terminal to be connected to a reference voltage;

a third resistor, wherein a first terminal of the third resistor is taken as the second addition terminal to receive the first adjustment signal, and a second terminal of the third resistor is connected to an addition terminal of the second comparator;

a fourth resistor, wherein a first terminal of the fourth resistor receives the first gamma signal, and a second terminal of the fourth resistor is connected to the addition terminal of the second comparator; and a fifth resistor connected between the addition terminal of the second comparator and an output terminal of the second comparator.

* * * * *